US009104963B2

(12) United States Patent
Amid et al.

(10) Patent No.: US 9,104,963 B2
(45) Date of Patent: Aug. 11, 2015

(54) SELF ORGANIZING MAPS FOR VISUALIZING AN OBJECTIVE SPACE

(75) Inventors: David Amid, Kiryat Ata (IL); Ateret Anaby-Tavor, Givat Ada (IL); Peter Bak, Haifa (IL); David Boaz, Bahan (IL); Shahar Chen, Omer (IL); Ofer Michael Shir, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 13/597,264

(22) Filed: Aug. 29, 2012

(65) Prior Publication Data

US 2014/0074758 A1 Mar. 13, 2014

(51) Int. Cl.
*G06F 15/18* (2006.01)
*G06N 3/02* (2006.01)

(52) U.S. Cl.
CPC .................................... *G06N 3/02* (2013.01)

(58) Field of Classification Search
None
See application file for complete search history.

(56) References Cited

U.S. PATENT DOCUMENTS 7,921,371 B1 4/2011 Roubstov et al.

OTHER PUBLICATIONS

Pareto Optimal Solutions Visualization Techniques for Multiobjective Design and Upgrade of Instrumentation Networks 2003 Miguel Bagajewicz and Enmanuel Cabrera School of Chemical Engineering & Materials Science, University of Oklahoma, 100 E. Boyd Street, T-335, Norman, Oklahoma 73019-1004.*

Visualization and Data Mining of Pareto Solutions Using Self-Organizing Map Shigeru Obayashi and Daisuke Sasaki 2003 Institute of Fluid Science, Tohoku University, Sendai, 980-8577 Japan obayashi@ieee.org, sasaki@reynolds.ifs.tohoku.ac.jp.*

Self-Organizing Map of Pareto Solutions Obtained From Multiobjective Supersonic Wing Design 2002 Shigeru Obayashi and Daisuke Sasaki Tohoku University Katahira 2-1-1-, Sendai, Japan 980-8577.*

Decision Making in Multi-Objective Optimization for Industrial Applications Jun. 1-5, 2009, Lisbon, Portugal—Data Mining and Visualization of Pareto Data Martin Liebschera, Katharina Witowskia, Tushar Goelb.*

Contextual self-organizing maps for visual design space exploration 2010 Brett Nekolny Iowa State University, bnekolny@iastate.edu.*

Visualization in the Multiple Objective Decision-Making Framework Pekka Korhonen and Jyrki Wallenius Helsinki School of Economics, Department of Business Technology, P.O. Box 1210, FI-00101 Helsinki, Finland, pekka.korhonen@hse.fi, jyrki.wallenius@hse.fi 2008.*

(Continued)

*Primary Examiner* — Kakali Chaki
*Assistant Examiner* — Ababacar Seck

(57) ABSTRACT

A method of visualizing a plurality of designs which comply with a plurality of objectives. The method comprises acquiring a plurality of designs each represented by sequential multivariate data indicative of a compliance with a plurality of objectives, generating an objective anchored based self-organizing map (SOM) having a plurality of objective anchors and maps the plurality of designs in an objective space, and outputting the objective anchored based SOM. Each objective anchor is associated with one of the plurality of objectives, each the design is visualized in the objective anchored based SOM by an indicator which the distance thereof from each the objective anchors is indicative of a compliance thereof with a respective the associated objective in relation to other of the plurality of objectives.

21 Claims, 5 Drawing Sheets

100

Receiving a plurality of designs — 101

Receiving objective space definition — 102

Generating an anchored based SOM — 103

(56) References Cited

OTHER PUBLICATIONS

Yoshimi et al., "Visualization of Pareto Solutions by Spherical Self-Organizing Map and It's acceleration on a GPU", Journal of Software Engineering and Applications, vol. 5, No. 3, pp. 129-137, 2012.

Bruckner et al., "SOMMOS—Self-Organizing Maps for Visualizing Multi-Objective Pareto Frontiers", Eurographics 2012, vol. 31 , No. 3, 2012.

* cited by examiner

SELF ORGANIZING MAPS FOR VISUALIZING AN OBJECTIVE SPACE

BACKGROUND

The present invention, in some embodiments thereof, relates to data and, more specifically, but not exclusively, to visualization of designs in an objective space.

In real-world problems decision-makers are often imposed to multiple conflicting objectives, and a large solution space with many possible options to consider. A long-studied topic in the area of multi-criterion decision making (MCDM) is how to assist decision-makers in reaching better decisions in a more efficient way. The multi-criterion decision making process typically involves two mathematical spaces:

(a) the design space which comprises the set of defining variables of the candidate solutions, sometimes referred to as the decision variables; and (b) the objective space, which constitutes the mapping of each candidate design point (i.e., a collection of design variables in the design space) to the values quantifying their quality with respect to the given objective functions (i.e., a vector of objective function values), the space where optimality is defined and where tradeoffs are explored.

Decision-makers typically examine the objective space and consequently select an option that meets their criteria; however, in most practical scenarios, the amount of options is too large to be examined by a human, and decision-makers aspire to examine a limited set of options. The task of visualizing solutions, such as Pareto-optimal solutions in an objective space, such as Pareto Frontier objective space, is based upon multivariate visualization.

SUMMARY

According to some embodiments of the present invention, there is provided a method of visualizing a plurality of designs which comply with a plurality of objectives. The method comprises acquiring a plurality of designs each represented by sequential multivariate data indicative of a compliance with a plurality of objectives, generating an objective anchored based self-organizing map (SOM) having a plurality of objective anchors and maps the plurality of designs in an objective space, and outputting the anchored based SOM. Each the objective anchor is associated with one of the plurality of objectives, each the design is visualized in the objective anchored based SOM by an indicator which the distance thereof from each the objective anchors is indicative of a compliance thereof with a respective the associated objective in relation to other of the plurality of objectives.

According to some embodiments of the present invention, there is provided a system of visualizing a plurality of designs which comply with a plurality of objectives. The system comprises a processor, an input unit which acquires a plurality of designs each represented by sequential multivariate data indicative of a compliance with a plurality of objectives, a self-organizing map (SOM) module which generates an objective anchored based SOM having a plurality of objective anchors and maps the plurality of designs in an objective space; and an output unit which outputs the objective anchored based SOM. Each objective anchor is associated with one of the plurality of objectives, each the design is visualized in the SOM by an indicator which the distance thereof from each the objective anchors is indicative of a compliance thereof with a respective the associated objective in relation to other of the plurality of objectives.

According to some embodiments of the present invention, there is provided a computer program product for visualizing a plurality of designs which comply with a plurality of objectives. The program product comprises a computer readable storage medium first program instructions to acquire a plurality of designs each represented by sequential multivariate data indicative of a compliance with a plurality of objectives, second program instructions to generate an objective anchored based self-organizing map (SOM) having a plurality of objective anchors and maps the plurality of designs in an objective space, and third program instructions to outputting the objective anchored based SOM. Each the objective anchor is associated with one of the plurality of objectives, each the design is visualized in the objective anchored based SOM by an indicator which the distance thereof from each the objective anchors is indicative of a compliance thereof with a respective the associated objective in relation to other of the plurality of objectives. The first, second, and third program instructions are stored on the computer readable storage medium.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a method of a visualizing a plurality of designs, defined by sequential multivariate data and comply with a plurality of objectives, in an objective space, according to some embodiments of the present invention;

FIG. 2 is a relational view of software components of a system of visualizing in an objective space a plurality of designs that may be used for implementing the method depicted in FIG. 1, according to some embodiments of the present invention;

FIGS. 3 and 4 are images of exemplary objective anchored based SOMs, according to some embodiments of the present invention;

Figure 5:
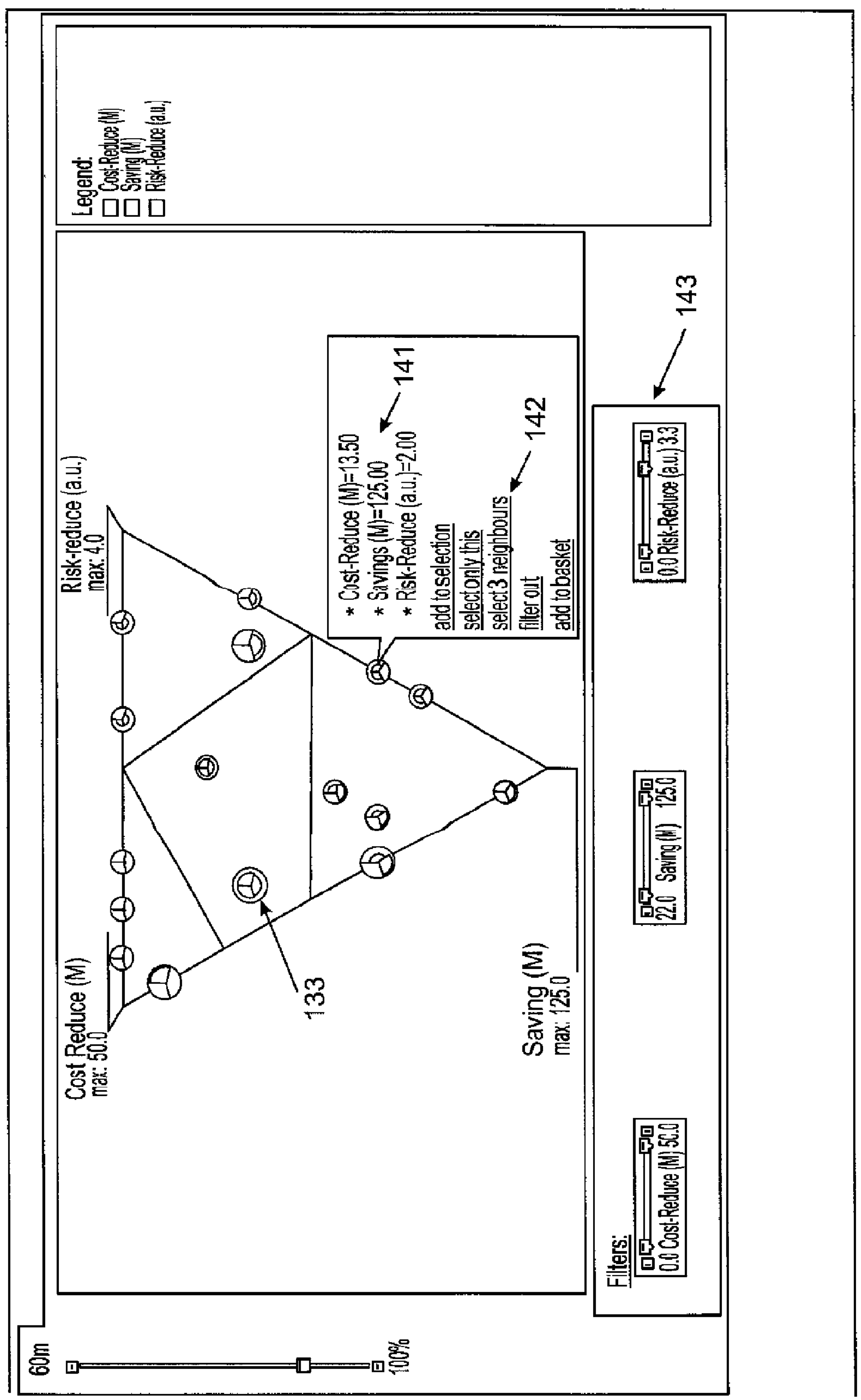
Figures 6A, 6B:
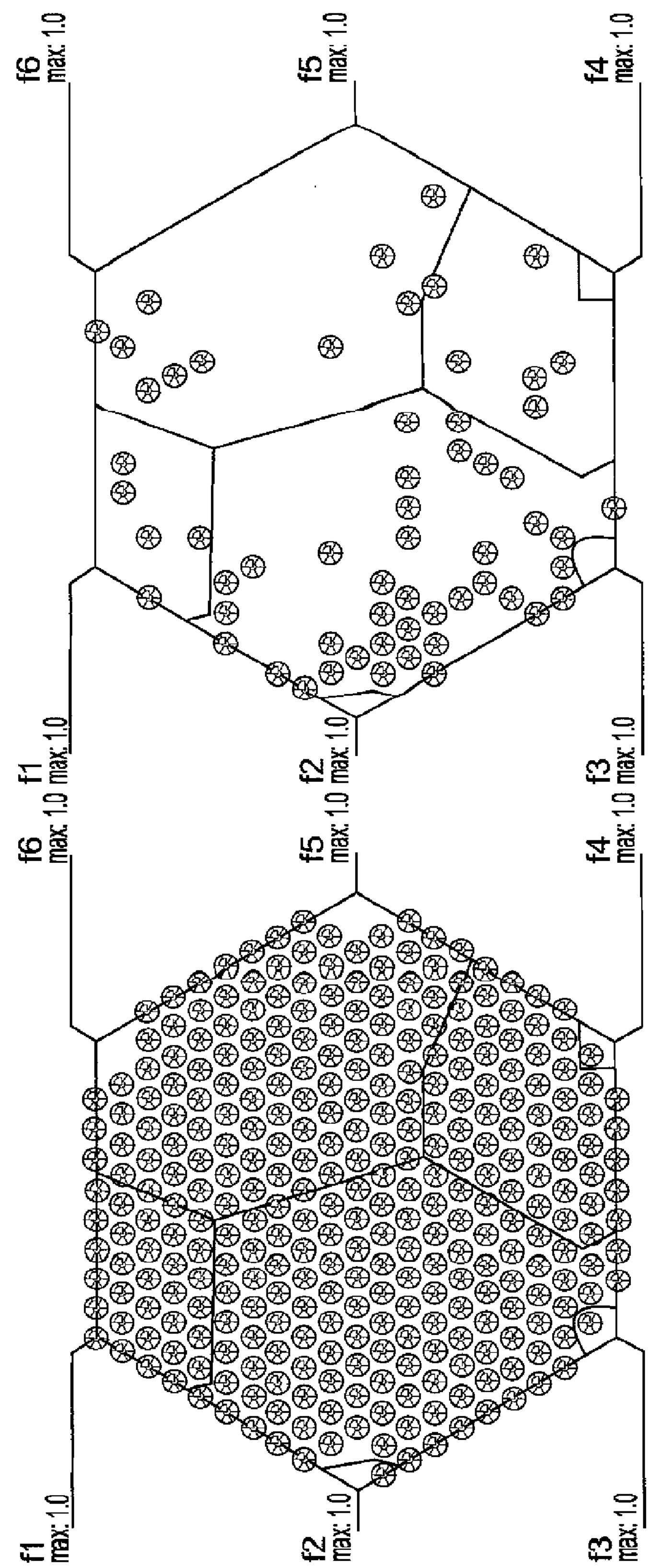

FIG. 5 is a screenshot of a graphical user interface that depicts an objective anchored based SOM and a number of controls, according to some embodiments of the present invention; and FIGS. 6A and 6B are images of exemplary objective anchored based SOMs generated based on designs related to a multi-objective optimization problem from the domain of optics, the so-called multi-objective diffraction grating problem, according to some embodiments of the present invention.

DETAILED DESCRIPTION

The present invention, in some embodiments thereof, relates to data and, more specifically, but not exclusively, to visualization of designs in an objective space.

According to some embodiments of the present invention, there are methods and systems of visualizing multi objective designs (referred to herein as designs) represented by sequential multivariate data, for example optimal solutions of a multi-objective optimization, as design indicators (i.e. glyphs) mapped onto a self-organizing map (SOM) that includes a plurality of objective anchors. The distance between a design indicator of a certain design and each one of the objective anchors is indicative of a compliance level of the certain design with a certain objective in relation to other objectives.

Optionally, this anchored based SOM is a polygon wherein each vertex is associated with another objective. Optionally, the polygon is a symmetric polygon. Optionally, the SOM is clustered according to a partitioning of the designs that is based on their compliance level values. Optionally, the anchored based SOM is generated by training to a neuron of a network representing the objective anchors and the designs. Optionally, the designs are a Pareto optimal set. Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
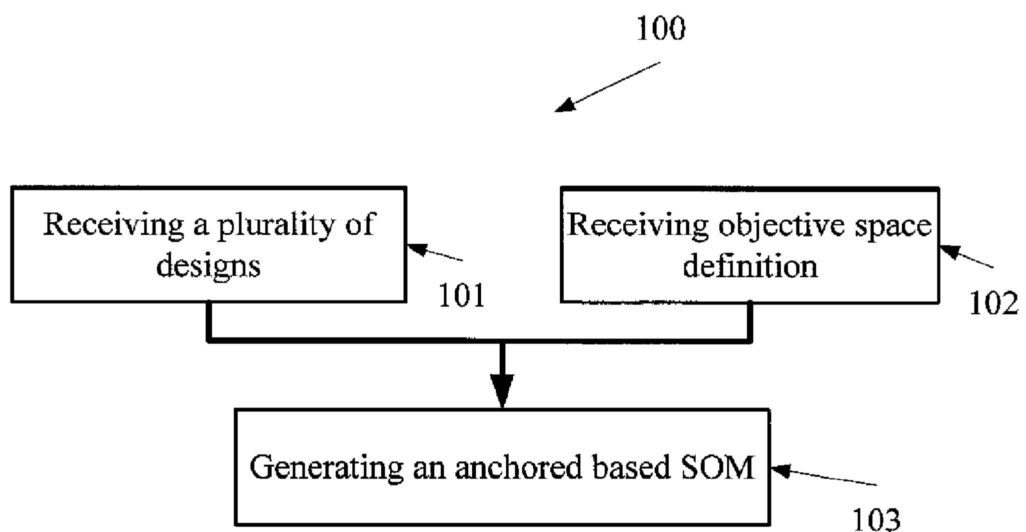
Figures 3, 4:
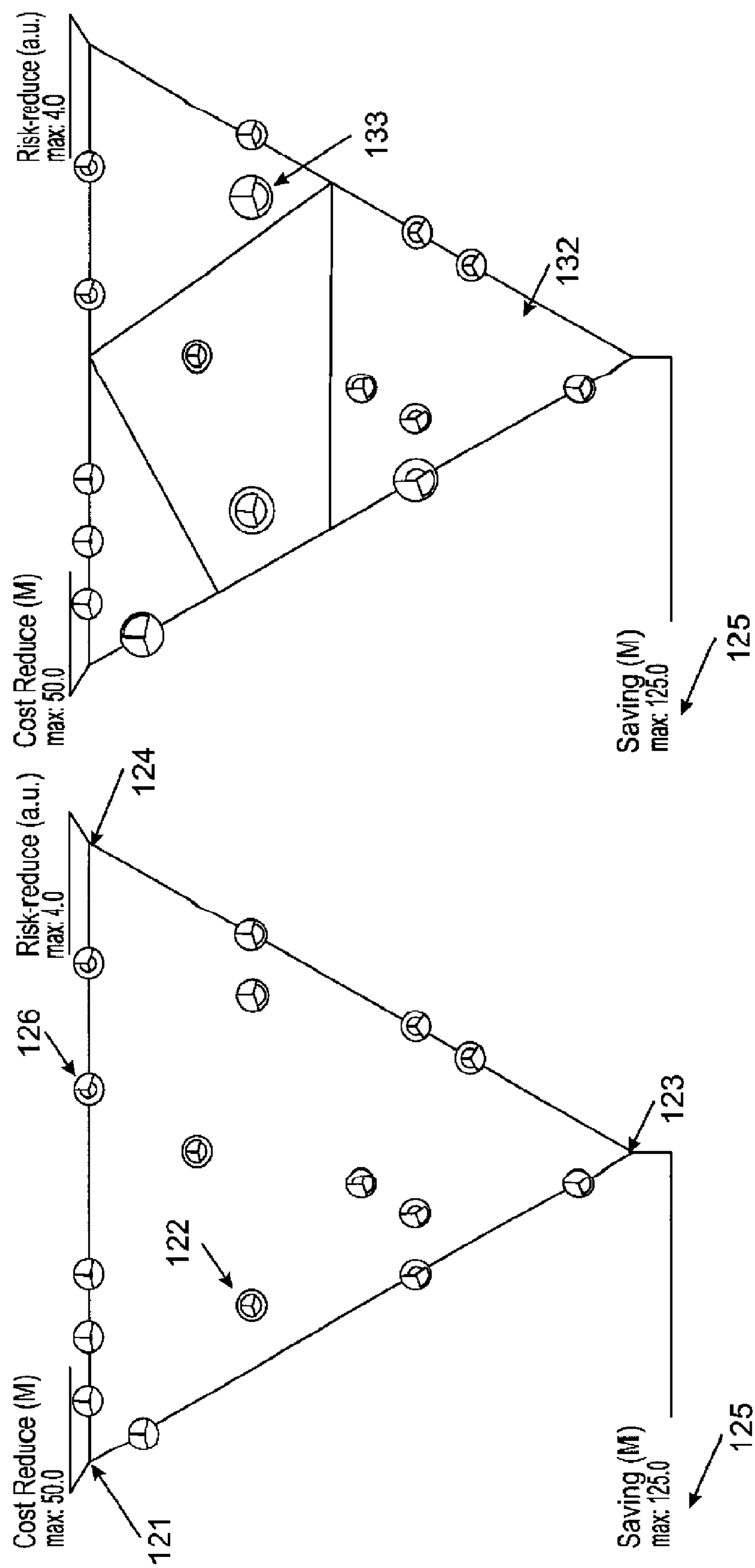

Reference is now made to FIG. 1 is a method of a visualizing a plurality of designs, defined by sequential multivariate data and comply with a plurality of objectives, in an objective space, according to some embodiments of the present invention. In these embodiments, a presentation, which may be static or dynamic, for example a colored graph, for instance as depicted in FIGS. 3 and 4, indicative of the compliance level of each one of the designs with each one of the objectives is automatically generated. For example, a self-organizing map (SOM) which maps design in an objective space is created where each objective is represented in the SOM by an objective anchor indicator, referred to herein as an objective anchor, see T. Kohonen. Self-Organizing Maps. Springer, Berlin, 3rd edition, 2001. The SOM is optionally created by a learning algorithm wherein a network of prototype vectors is formed. As further described below, the presentation allows visualizing of optimal designs, such as Pareto-Frontier design outcomes, in a manner that indicates, for each design, per objective, a relative objective compliance level.

It should be noted that in Pareto Frontier data, equal importance is set to each of the objectives. This requires equal representation of the visualization dimensions to allow equal interpretation of the dimensions by the user. The above outlined presentation, which is further described below, provides an explicit representation of the dimensions for each design using a proximity (or distance) between a certain design indicator and objective anchor indicators which are used as fixed points, each for another objective. For example, in FIG. 3, the distance between objective anchor 121, which is indicative of cost reduce objective (M), and design indicator 122 indicates that the design indicated by design indicator 122 comply with the cost reduce objective more than the design indicated by design indicator 126.

Optionally, the objective anchors are uniformly positioned along a perimeter of a polygon, either marked or virtual, populating corners of a map. This may be accomplished by using a symmetric polygon, for example a polygon with m equally lengthened edges and positioning the objective anchors at all m corners.

Figure 2:
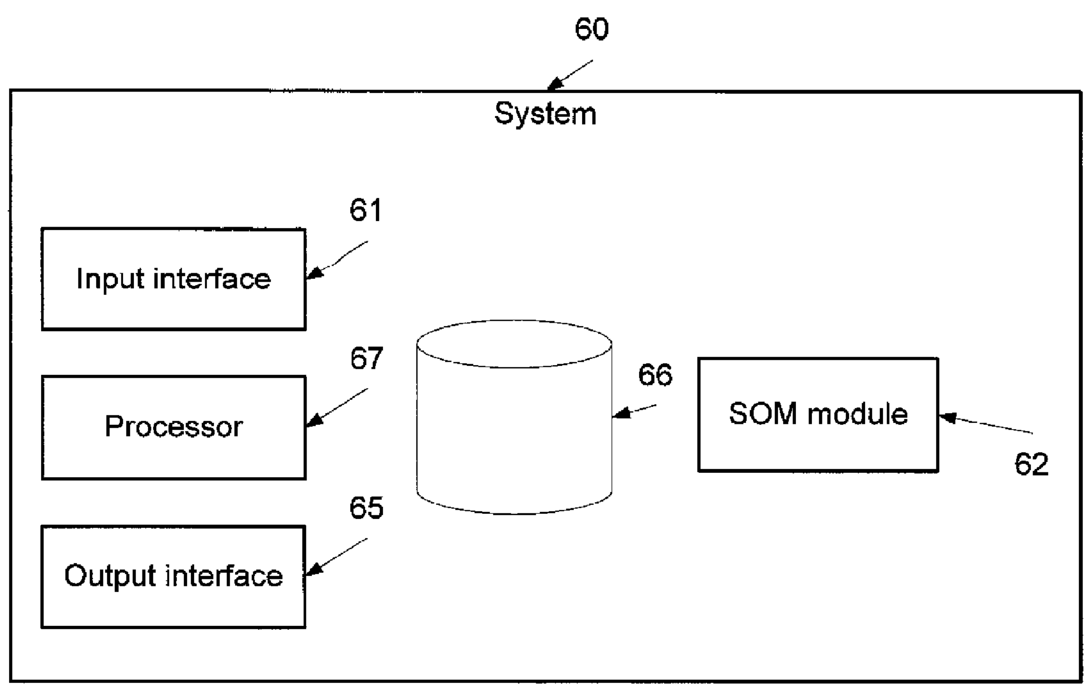

Reference is also made to FIG. 2, which is a relational view of software components of a system 60 of visualizing in an objective space a plurality of designs that may be used for implementing the above method 100, according to some embodiments of the present invention. As shown, the system 60 includes a processor 67 and following software and/or hardware components: as an input interface 61, a SOM module 62, and an output interface 65. The system 60 may be implemented in a client terminal hosting a design platform, for example as a feature of the design platform and/or an add-on thereto. The system 60 may be implemented in software as a service (SaaS) that is hosted centrally and accessed by users using a client module, such as a web browser, over the Internet or an Ethernet.

First, as shown at 101 and 102, a plurality of designs represented by sequential multivariate data and indicative of a compliance with a plurality of objectives and an objective space definition(s) are received. As used herein, a design may be any design which has one or more objectives, optionally conflicting, for example a product design, a process design, a financial design, an aircraft design, a mechanical design, an oil and gas industry design, an automobile design, and/or a design having variables which have to be set in the presence of trade-offs between two or more conflicting objectives. The tradeoff maybe any condition that involve reducing one quality or aspect of something in return for a gain in another quality or aspect. Conflicting objectives may be budget variables versus performances variables, gas consumption versus velocity, size versus volume, and/or the like.

Optionally, the designs are optimal solutions in multi-objective optimization, also referred to as Pareto optimality, within the received objective space, such as a Pareto domination, which states that one objective vector dominates another if all its values are at least as good as the other's, but it is strictly better in at least one of the objectives. Such designs may be a Pareto optimal set. In such an embodiment, the method may include a preliminary processing wherein the Pareto optimal set is calculated, optionally according to one or more methods known in the art.

Optionally, the designs may be obtained dynamically, for instance received from a user, for example using a graphical user interface (GUI) or any other user interface (UI). These solutions may be computed entirely prior to interaction with the user. For example, the user may select a Pareto optimal set selected for a certain objective space and a design variables space. The Pareto optimal set may be represented as sequential multivariate data stored in a database 66, for example each design may include record indicating compliance values (e.g. percentage, relative portion and/or the like) of a plurality of objectives and a design identifier, for example a name or a number. The compliance values, also referred to as objective values, are quantitative and sequential variables which range between minimally-attainable values and maximally-attainable values.

Now, as shown at 103, an objective anchored based SOM having a plurality of objective anchors is generated. The objective anchored based SOM maps the obtained designs in an objective space, for example the Pareto optimal set in Pareto domination. Each objective anchor is an indicator representing one of the objectives according to which the designs are defined.

For example, m objective anchors are represented by m corners of a polygon map representing the objective space. The polygon map may be a symmetric polygon with m equally lengthened edges wherein the objective anchors are m vertices. Thus, given an m-dimensional objective space subject to maximization, m vectors may be constructed, where the $i^{th}$ vector, where $1 \leq i \leq m$, maximizes the value of the $i^{th}$ objective and minimizes the values of the remaining $m-1$ objectives. For instance, in FIG. 3, the objective space is represented by a triangular layout as each design has a triplet of objectives. Optionally, the generation of the objective anchored based SOM is made by training neurons representing the objective anchors in relation to each one of the designs. During the training, these neurons are changed by constantly resetting their values to their original extreme solution value.

Each design is represented by a design indicator, such as a symbol, an icon, and/or a number that is positioned in the objective anchored based SOM so that its location is indicative of its relative compliance to each one of the objectives. Optionally, the populated objective anchored based SOM is generated by setting vectors that yield such a map with indicative orientation, for example, the closer the solution is to a corner of an objective anchor, the greater is the value in that objective. It should be noted that some level of an orientation error may occur in small values.

The created objective anchored based SOM allows a user to examine and/or select designs according to their presented proximity to one or more objective anchors. The user may identify, examine and/or select area(s) of interest in the objective anchor based SOM and/or identify, examine and/or select a tradeoff between designs with different objective values.

Optionally, attainable numeric values at the objective anchors of the objective anchored based SOM are presented to eliminate initial check of boundaries (i.e. by the user). The attainable numeric values, which are the values of the anchors, for example as depicted by numeral 125 of FIGS. 3 and 4, may be maximized or minimized.

Due to symmetry, the objective anchor based SOM may have (m−1)! possible objective anchor arrangements. Optionally, an arrangement is selected by a user. Optionally, an arrangement is selected based on one or more quality criteria. The quality criteria may be, for example, any of the following a quantization error, a topographic error, a local orientation error, and a global orientation yield. The orientation errors (OE) is optionally calculated as follows:

$$V_\ell(\vec{u}_i, \vec{u}_j) = \begin{cases} 1 & \text{if } \left((u_{i,\ell} < u_{j,\ell}) \bigwedge \left(d(\vec{a}_\ell, \vec{u}_i) < d(\vec{a}_\ell, \vec{u}_j)\right)\right) \\ 0 & \text{otherwise} \end{cases}$$

where d( ) denotes an Euclidean distance metric in a map space. A local orientation error is defined as a summation over all anchors of violations weighted by the neighbourhood kernel h( ):

$$OE = \sum_{\ell=1}^{m} \sum_{i=j} h\left(d(\vec{a}_\ell, \vec{u}_i)\right) \cdot V_\ell(\vec{u}_i, \vec{u}_j)$$

Global orientation is defined by minimizing the local orientation error while maximizing at the same time the global spatial diversity of all the units. For example, the so-called Solow-Polasky diversity measure may be used, see A. Solow and S. Polasky. Measuring biological diversity. Environmental and Ecological Statistics, 1:95-103, 1994. Given pairwise distances between the units, $d(\vec{u}_i, \vec{u}_j)$, let $\Psi=(\psi_{ij})\in\mathbb{R}^{|M|\times|M|}$ be defined with elements $\psi_{ij}=\exp(-\theta\cdot d(\vec{u}_i, \vec{u}_j))$ then the Solow-Polasky measure is defined as: $D_{SP}=\vec{1}^T\Psi^{-1}\vec{1}$. For example, the summation over all the elements of $\Psi^{-1}$. Note that θ is a domain-specific normalization factor that may be set by the user. The Solow-Polasky diversity measure strives to quantify the number of existing species within the given spatial domain. Thus, the larger this scalar, the more diverse the map is, and following the aforementioned rationale, better global orientation is obtained.

According to some embodiments of the present invention, as shown at FIG. 4, an additional clustering layer is added on top of objective anchored based SOM. The additional clustering layer divides the objective anchored based SOM into areas to enable a user to identify area of interest(s) (clusters of designs). For example 131 and 132 are two different areas indicated by different colors. By choosing an area of interest it is expected that similar designs are selected. The areas of interest may be selected by clustering the designs to clusters in which each design belongs to the cluster with designs having a nearest mean. For example, FIG. 4 depicts clusters of designs obtained by processing designs from a Pareto Frontier data with a K-Means algorithm, see Lloyd. Least squares quantization in PCM. Information Theory, IEEE Transactions on, 28(2):129-137, March 1982. Each cluster may be assigned with a pattern or a color, for example following Colorbrewer's qualitative color scale. see C. Brewer and M. Harrower. Colorbrewer. The value of K, for example a desired number of clusters given as input to K-Means may be derived from the number of objectives, for example K∈{m+1,m+2}. Optionally, this parameter may be tuned.

Optionally, each objective is assigned with a color, for example following Colorbrewer's qualitative color. Optionally, as shown at FIG. 4, each design is represented by a color chart, such as a radial bar chart wherein the relative compliance with a certain objective, also understood as the magnitude of the certain objective, is represented by a chart sector colored in the color selected for the certain objective. The larger is the area of the colored sector, the higher is the compliance level of the design to that objective. To gain a perception of the magnitude, a contour, such as 133, is optionally added by overlaying the radial bar chart on a blank equiangular pie chart with radius 1.0. The color charts assist the user in understanding the tradeoff between objective values for a specific individual design, identify correlative designs and/or to compare between different designs and/or to instantly identify global trends.

Optionally, the displayed objective anchored based SOM is interactive. For example, as shown at 141 of FIG. 5, numeric values of each objective may be presented to a user upon selection, for example when he places a cursor thereon.

Optionally, the user may fixate on an area of interest, zoom-in and view the design charts more clearly. Optionally, the user navigates through the map at a resolution that fits his needs. Upon hovering over a specific solution, a tool-tip 142 pops up to provide more details and to enable certain interactions. Optionally, a user may control one or more filtering schemes using a control, such as depicted in 143 of FIG. 5. In such a manner, once a user reviews the map, he may filter unwanted designs by defining objective parameter range(s). Furthermore, the user may even select the nearest neighbors in order to examine them in more detail, using existing map or additional views.

Optionally a displayed design can be associated with a recommendation ranking. For example the designs representations may be enlarged 133 by multiplying their radii sizes by the desirability metric value (i.e., the explicit expected marginal utility).

Tradeoff-based filtering methods may be employed. For example, the so-called Smart Pareto Filter—C. Mattson, A. Mullur, and A. Messac. Smart Pareto Filter: Obtaining a Minimal Representation of Multiobjective Design Space. Engineering Optimization, 36(4):721-740, 2004 May be used to reduce density of solutions on the presented designs based upon desired tradeoff patterns, as can be seen in FIG. 6B which is a filtered version of FIG. 6A.

Reference is now made to an exemplary description of generating an objective anchor based SOM that semantically represents optimums of individual objective functions as objective anchor points within the map. To obtain symmetry between objectives, the objective anchors are optionally set as vertexes on the perimeter of a polygon having a number of edges which correspond with the number of objectives.

Optionally, a polygon layout is saved as an overlay on top of the map default layout, while neurons that are not within the overlaid layout are discarded. This ensures that a given dataset is only associated with neurons within the layout that is eventually presented to the user as the output.

Reference is now made to a pseudo-code of an exemplary process of creating an objective anchor based SOM. The pseudo-code is set as follows:

learnSOMMOS( )

input Dataset: Pareto Frontier $\mathcal{D} = \{\vec{x}_k\}_{k=1}^{|\mathcal{D}|}, \vec{x}_k \in \mathbb{R}^m$
1: normalizeData( )
2: initSOMMOS( )
3: for t = 0 . . . $T_{period}$ do
4: S ←randomSampling($\mathcal{D}$)
5: trainSOMMOS($\mathcal{M}$, $\mathcal{S}$, $h_D$( ), $\alpha_D$(t)
6: if (mod (t,$T_{anchor}$) == 0) then
7: trainSOMMOS($\mathcal{M}$, $\mathcal{A}$, $h_A$( ), $\alpha_A$(t))
8: $\{\vec{a}_l\}_{l=1}^m \subset \mathcal{M} : \vec{a}_l \leftarrow \mathcal{I}_{:,l}$ {anchoring: explicit fixing at the vertices}
9: end if
10: end for
11: return $\mathcal{M}$ initSOMMOS ( )

1: set map size: N
2: set anchoring dataset by means of the m × m identity $\mathcal{I}$: $\mathcal{A} = \{\mathcal{I}_{:,l}\}_{l=1}^m$
3: generate an m-gon layout as the neutral map: $\mathcal{M} = \{\vec{u}^{(j)}\}_{j=1}^N, \vec{u}^{(j)} \in \mathbb{R}^m$
4: randomly initialize neurons: $\vec{u}^{(j)} \leftarrow \mathcal{U}(0,1)$, j = 1 . . . N
5: identify and reset the m-gon's vertices: $\{\vec{a}_l\}_{l=1}^m \subset \mathcal{M} : \vec{a}_l \leftarrow \mathcal{I}_{:,l}$
6: initialize learning-rate functions: $\alpha_D$(t), $\alpha_A$(t)
7: initialize neighborhood kernals: $h_D$( ), $h_A$( )
8: set training period and anchoring epoch: $T_{period}$, $T_{anchor}$ trainSOMMOS(map $\mathcal{M}$, data $\mathcal{X}$, kernel h ( ), learning-rate $\alpha$)

1: for each point in the dataset $\vec{x}_k \in \mathcal{X}$ do
2: for each neuron $\vec{u}^{(j)} \in \mathcal{M}$ do
3: $\vec{u}^{(j)} \leftarrow \vec{u}^{(j)} + \alpha \cdot h(\vec{x}_k, \mathcal{M}) \cdot (\vec{x}_k - \vec{u}^{(j)})$
4: end for
5: end for Optionally, in a training phase, marked as trainSOMMOS, objective anchors are trained in different objective anchoring-epochs, marked as $T_{objective\ anchor}$, a given vertex-neuron, $\vec{a}_l \in \{\vec{a}_l\}_{l=1}^m \subset \mathcal{M}$, percolates to surrounding neurons its value based on one or more learning functions. Consequently, the closer a neuron is to a vertex, the stronger it learns an appropriate objective anchor value. Optionally, as in each update-step data point's keep percolating their values, the objective anchors repeatedly train the objective anchor based SOM as an additional independent dataset A, which represents only vertices. Optionally, actual vertex-units are also explicitly re-set. Essentially, the learning procedure may comprise two processes with different learning-rates. A first learning-rate function for input dataset of designs D, denoted as αD(t), declines over time to stabilize the network and achieve convergence. A second learning-rate function, denoted as αA(t), is used for objective anchoring dataset A. For example, αA(t) declines from 1.0 to αD(t) for neurons up to a radius rA from the vertex, and otherwise reads αD(t) for more distant neurons. The overall learning of a polygon neural map with m edges is summarized as exemplified by the pseudo-code marked as learnSOMMOS( ) above where the dataset is optionally normalized and the objective anchoring is carried out by m-dimensional identity matrix.

As described above, the received data may be a Pareto optimal set. The proposed semantically enhanced SOM generation technique provides a visualization of the entire Pareto Frontier. The objective anchor based SOM optionally has a symmetric polygon layout to allow equal interpretation of the dimensions by the user. Optionally, the objective anchor based SOM is augmented with objective anchor based orientation and individual representation of designs (i.e. to meet the requirements of the multi-objective visualization problem).

Reference is now made to FIGS. 3 and 4 which are exemplary objective anchored based SOMs, generated according to some embodiments of the present invention, which depict designs of a simulated multi-objective project portfolio management (PPM) optimization problem. The PPM explores the complete set of projects a company is involved in, to decide which projects, referred to as designs, should be included or excluded from a portfolio. Interdependencies between projects are also accounted for, in order to make sure that no contradicting or overlapping projects are executed. Achieving an optimal portfolio mix requires a company to clearly articulate what the portfolio should achieve, its goals and objectives. The objectives may vary across organizations, however the prominent ones are maximizing financial metrics such as savings, net present value, return on investment, while minimizing the risk the company is subject to, see B. D. Reyck, Y. Grushka-Cockayne, M. Lockett, S. R. Calderini, M. Moura, and A. Sloper. The impact of project portfolio management on information technology projects. International Journal of Project Management, 23(7):524-537, 2005.

In FIG. 3 a 3-dimensional PPM problem is depicted, where the objectives are defined as maximizing the risk reduction, maximizing the savings, and maximizing cost reduction. As an optimization solver, we employ the mixed-integer version of the so-called N. Beume, B. Naujoks, and M. Emmerich. SMS-EMOA: Multiobjective Selection Based on Dominated Hyper volume. European Journal of Operational Research, 2007 SMS-EMOA.

FIG. 3 depicts the attained map (left-hand side) as well as an analyzed map (right-hand side), which is further processed by means of K-Means clustering (K=4) and recommendation ranking. The objective anchored based SOM is generated with 50 neurons, and following these parametric values (for more details see Section 8): $T_{objective\ anchor}$=470, $r_A$=5:814, α(t=0)=46:52. This objective anchored based SOM is indicative of a conflict between the objectives. The top left cluster includes designs wherein Cost-Reduce and Risk-Reduce objectives are in a soft conflict, for example one does not lose much in Risk-Reduce as they maximize the Cost-Reduce but the Savings are considerably low. If the user is willing to slightly lose in Risk-Reduce but yet focus on Savings, they may easily grasp that the bottom cluster contains solutions which maximize Savings and have moderate Risk-Reduce. The user may note that the center cluster denotes a compromise between all objectives. Depending on the user preferences they may zoom into an area/cluster of interest. Each design in the objective space is mapped onto a portfolio of projects in the design space. So as the number of solutions in the objective space is narrowed down by the selection process, the presentation of the portfolio itself may play a significant role in the process.

Another exemplary objective anchored based SOM is depicted in FIGS. 6A and 6B where designs related to a multi-objective optimization problem from the domain of Optics, the so-called Multi-Objective Diffraction Grating problem are visualized, see O. M. Shir, J. Roslund, Z. Leghtas, and H. Rabitz. Quantum control experiments as a tested for evolutionary multi-objective algorithms. Genetic Programming and Evolvable Machines, May 2012. Springer.

Given a light-source illuminating a diffraction grating optical setup of slits and shining on a screen, this multi-objective problem is defined as simultaneously maximizing the light intensity at a set of competing sites positioned on a screen.

Based upon the characteristics of the slits and the exact locations of those sites, the intensity therein may be easily calculated in the Fraunhofer regime (i.e., far field), or otherwise measured. Thus, the phases of the individual slits (e.g., corresponding to glass covers) constitute the decision variables in this optimization problem, where the objective functions to be maximized are the calculated/measured intensities at the screen sites. The attractiveness of this family of test-problems lies within the scalability of variables and conflicting objective functions, as well as to its possession of complete mathematical formulation, extremely short simulation (computation) time, and practical link to experimental optimization.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the term a processor, a module, and a presentation unit is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of visualizing a plurality of designs which comply with a plurality of objectives, comprising:

acquiring a plurality of designs each represented by sequential multivariate data indicative of a compliance with a plurality of objectives;

generating an objective anchored based self-organizing map (SOM) having a plurality of objective anchors and maps said plurality of designs in an objective space; and outputting said anchored based SOM;

wherein each said objective anchor is associated with one of said plurality of objectives, each said design is visualized in said objective anchored based SOM by an indicator which the distance thereof from each said objective anchors is indicative of a compliance thereof with a respective said associated objective in relation to other of said plurality of objectives.

2. The method of claim 1, wherein said generating comprises training a plurality of neurons representing said plurality of objective anchors and said plurality of designs in a network, each said neuron is trained according to said sequential multivariate data of each said design.

3. The method of claim 1, wherein said plurality of designs are optimal solutions selected from a plurality of optional designs analyzed in a multi-objective optimization process.

4. The method of claim 2, wherein said plurality of designs is a Pareto optimal set.

5. The method of claim 1, wherein said indicator is a chart depicting a compliance level of a respective said design with each one of said plurality of objectives.

6. The method of claim 1, wherein said outputting comprises:

presenting said anchored based SOM on a display;

allowing a user to select a respective said indicator of one of said plurality of designs; and presenting data indicative of a compliance level of a respective said design with each one of said plurality of objectives.

7. The method of claim 1, wherein said plurality of objective anchors are positioned along a perimeter of a polygon depicting the perimeter of said objective space.

8. The method of claim 7, wherein said plurality of objective anchors are vertexes of said polygon.

9. The method of claim 8, wherein the number of said plurality of objective anchors is equal to the number of said vertexes of said polygon.

10. The method of claim 8, wherein said polygon is a symmetric polygon.

11. The method of claim 1, further comprising:

generating an overlay indicative of a plurality of areas of interest in said objective anchor based SOM, each said area of interest bounds a different group of said plurality of designs, and adding said overlay to a presentation of said objective anchor based SOM.

12. The method of claim 11, wherein said plurality of areas of interest are by clustering said plurality of designs to clusters in which each said design belongs to the cluster with designs having a nearest mean with regard to a compliance to said plurality of objectives.

13. The method of claim 1, wherein said generating comprises selecting an arrangement based at least one quality criteria.

14. The method of claim 13, wherein said at least one quality criteria is selected from a group consisting of a quantization error and a topographic error.

15. The method of claim 13, wherein said at least one quality criteria is based on an Euclidean distance metric in said objective space.

16. The method of claim 13, wherein said at least one quality criteria is based on a Solow-Polasky diversity measure.

17. The method of claim 1, wherein said generating comprises filtering said plurality of designs based on density distribution in said anchored based SOM.

18. The method of claim 1, wherein said generating comprises associating a recommendation ranking to each said design according to at least one desirability value.

19. The method of claim 1, wherein said generating comprises reducing density of said plurality of designs in said objective space according to a desired tradeoff pattern.

20. A system of visualizing a plurality of designs which comply with a plurality of objectives, comprising:

a processor;

an input unit which acquires a plurality of designs each represented by sequential multivariate data indicative of a compliance with a plurality of objectives;

a self-organizing map (SOM) module which generates an objective anchored based SOM having a plurality of objective anchors and maps said plurality of designs in an objective space; and an output unit which outputs said objective anchored based SOM;

wherein each said objective anchor is associated with one of said plurality of objectives, each said design is visualized in said SOM by an indicator which the distance thereof from each said objective anchors is indicative of a compliance thereof with a respective said associated objective in relation to other of said plurality of objectives.

21. A computer program product for visualizing a plurality of designs which comply with a plurality of objectives, comprising:

a non transitory computer readable storage medium;

first program instructions to acquire a plurality of designs each represented by sequential multivariate data indicative of a compliance with a plurality of objectives;

second program instructions to generate an objective anchored based self-organizing map (SOM) having a plurality of objective anchors and maps said plurality of designs in an objective space; and third program instructions to outputting said objective anchored based SOM;

wherein each said objective anchor is associated with one of said plurality of objectives, each said design is visualized in said objective anchored based SOM by an indicator which the distance thereof from each said objective anchors is indicative of a compliance thereof with a respective said associated objective in relation to other of said plurality of objectives;

wherein said first, second, and third program instructions are stored on said non transitory computer readable storage medium.

* * * * *